(12) United States Patent
Nagashima et al.

(10) Patent No.: US 7,015,669 B2
(45) Date of Patent: Mar. 21, 2006

(54) DRIVE APPARATUS FOR OPENING/CLOSING BODY FOR VEHICLE

(75) Inventors: Youji Nagashima, Kariya (JP); Kenji Maeta, Kariya (JP); Naoto Kamioku, Anjo (JP); Kouji Suzuki, Toyota (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/153,335

(22) Filed: Jun. 16, 2005

(65) Prior Publication Data

US 2005/0280387 A1 Dec. 22, 2005

(30) Foreign Application Priority Data

Jun. 17, 2004 (JP) ............................. 2004-180034

(51) Int. Cl.
*H02P 1/04* (2006.01)
(52) U.S. Cl. ...................... 318/443; 318/445; 318/466; 318/468; 318/286; 49/26; 49/28; 296/216.02; 296/216.04
(58) Field of Classification Search ........ 318/443–445, 318/466, 468, 280, 282, 286; 49/26, 28; 296/216.02, 216.04
See application file for complete search history.

(56) References Cited

U.S. PATENT DOCUMENTS

| | | | |
|---|---|---|---|
| 5,645,309 A * | 7/1997 | Graf ........................... 296/121 |
| 6,114,820 A * | 9/2000 | Nishigaya .................... 318/466 |
| 6,162,142 A * | 12/2000 | Hori et al. ................... 475/149 |
| 6,424,109 B1 * | 7/2002 | Ochiai et al. ................ 318/445 |
| 6,431,644 B1 * | 8/2002 | Nagashima et al. ......... 296/223 |
| 6,563,279 B1 * | 5/2003 | Sugawara .................... 318/443 |
| 6,581,331 B1 * | 6/2003 | Kral ............................. 49/339 |

FOREIGN PATENT DOCUMENTS

JP        2004-011322 A       6/2002

* cited by examiner

*Primary Examiner*—Rina Duda
(74) *Attorney, Agent, or Firm*—Sughrue Mion, PLLC

(57) ABSTRACT

A drive apparatus for an opening/closing body for a vehicle includes a drive unit including a rotational drive apparatus, a reduction gear mechanism linked with a rotational shaft of the rotational drive apparatus, and an output member linked with the rotational shaft through the reduction gear mechanism and linked with the opening/closing body through a connection member, a first pulse signal generator provided at the drive unit and generating a first pulse signal on the basis of a rotation of the rotational shaft, a second pulse signal generator provided at the drive unit and generating a second pulse signal on the basis of a rotation of either one of the reduction gear mechanism and the output member, and a control means for calculating an opening/closing position of the opening/closing body on the basis of the first pulse signal emitted by the first pulse signal generator utilizing the second pulse signal emitted by the second pulse signal generator as a base point and controlling the rotational drive apparatus corresponding to the opening/closing position of the opening/closing body.

15 Claims, 15 Drawing Sheets

DRIVE APPARATUS FOR OPENING/CLOSING BODY FOR VEHICLE

CROSS REFERENCE TO RELATED APPLICATIONS

This application is based on and claims priority under 35 U.S.C. § 119 to Japanese Patent Application 2004-180034, filed on Jun. 17, 2004, the entire content of which is incorporated herein by reference.

FIELD OF THE INVENTION

This invention generally relates to a drive apparatus for an opening/closing body. More specifically, this invention pertains to a drive apparatus for an opening/closing apparatus for a vehicle for moving an opening/closing body of a vehicle.

BACKGROUND

As a drive apparatus for an opening/closing body such as a sunroof panel and a sunshade panel provided at a roof of a vehicle, a roof panel and a back window panel of a convertible, a swing door and a tail gate provided at sides or rear portion of the vehicle, a window panel provided at a door of a vehicle, in JP2004-11322A, a conventional drive apparatus including a rotational drive apparatus, a drive unit including a reduction gear mechanism linked with a rotational shaft of the rotational drive apparatus and an output member linked with the rotational shaft through a reduction gear mechanism and linked with an opening/closing body through a connection member, a pulse signal generator provided at the drive unit and generating a pulse signal on the basis of rotations of the rotational shaft, and a control means for calculating a position of the opening/closing body in relation to opening and closing on the basis of the pulse signal emitted by the pulse signal generator and for controlling stop of the rotational drive apparatus on the basis of the position of the opening/closing body in relation to opening and closing is described.

In addition, the drive unit includes a position-detecting means for detecting that the connection member achieves a predetermined base position provided between the drive unit and the connection member. When the position-detecting means detects that the connection member achieves the base position, a calculation of position on the basis of pulse signals generated by the pulse signal generator is corrected, and thus a predetermined opening/closing position of the opening/closing body can be recognized more accurately.

However, in the conventional apparatus described above, the position-detecting means detects the base position through the connection member. Accordingly, a detected portion of the connection member detected by the position-detecting member becomes the base position only once in a whole stroke for opening and closing the opening/closing body. In other words, chance for detecting the base position by the position-detecting means is obtained only once in the whole stroke for opening and closing the opening/closing body. Therefore, depending on a width of a range of opening and closing the opening/closing body, when the opening/closing body is opened or closed in only a range that the connection member does not achieve the base position, the calculation of position of the opening/closing body on the basis of pulse signals generated by the pulse signal generator cannot be corrected. As a result, there is a danger that the control means does not recognize the predetermined position accurately.

A need thus exists for a drive apparatus for an opening/closing body of a vehicle in which a control means can recognize a predetermined position accurately, regardless of a width of a range of opening and closing the opening/closing body.

SUMMARY OF THE INVENTION

According to an aspect of the present invention, a drive apparatus for an opening/closing body for a vehicle includes a drive unit including a rotational drive apparatus, a reduction gear mechanism linked with a rotational shaft of the rotational drive apparatus, and an output member linked with the rotational shaft through the reduction gear mechanism and linked with the opening/closing body through a connection member, a first pulse signal generator provided at the drive unit and generating a first pulse signal on the basis of a rotation of the rotational shaft, a second pulse signal generator provided at the drive unit and generating a second pulse signal on the basis of a rotation of either one of the reduction gear mechanism and the output member, and a control means for calculating an opening/closing position of the opening/closing body on the basis of the first pulse signal emitted by the first pulse signal generator utilizing the second pulse signal emitted by the second pulse signal generator as a base point and controlling the rotational drive apparatus corresponding to the opening/closing position of the opening/closing body.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
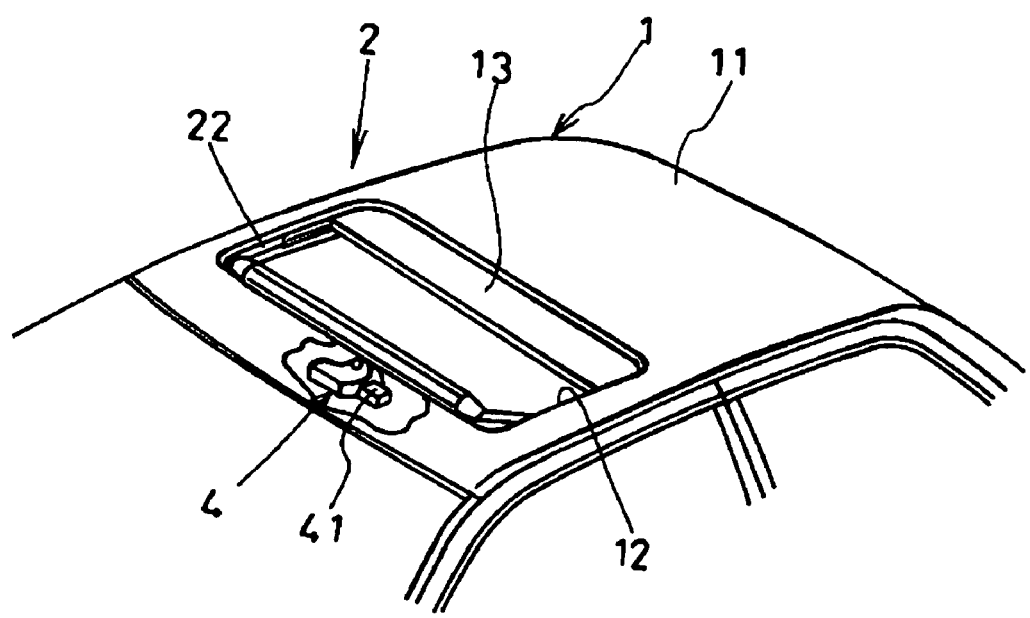
FIG. 1 represents a perspective view illustrating a vehicle on which a sunroof apparatus including a drive apparatus according to an embodiment of the present invention is mounted.

An embodiment of the present invention will be explained with reference to drawing figures. As illustrated in FIG. 1, a roof panel 11 of a vehicle 1 includes an opening portion 12. A sunroof apparatus 2 including a movable panel 13 (opening/closing body) for opening and closing the opening portion 12 is provided at the roof panel 11.

Figure 2:
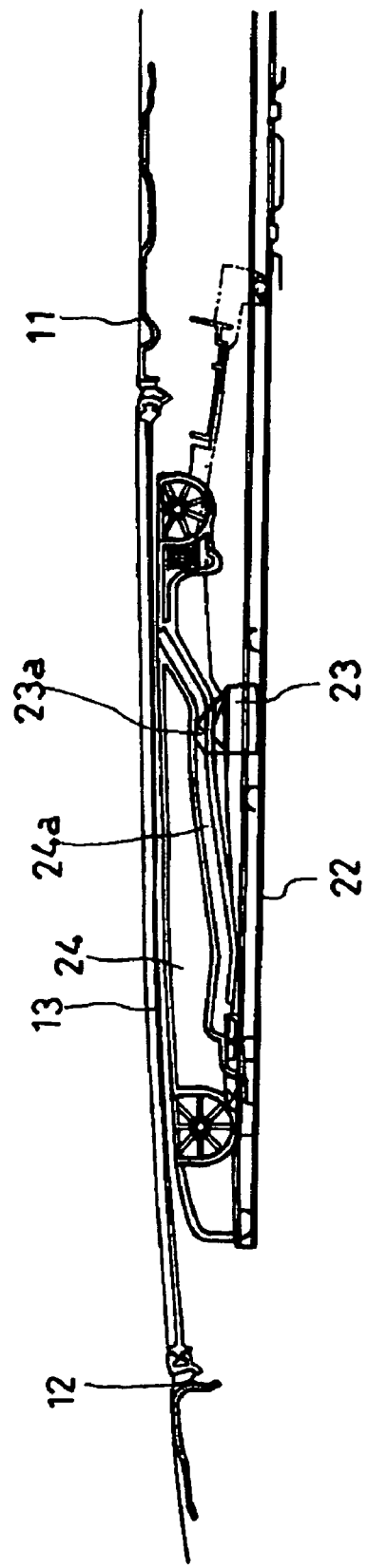
FIG. 2 represents a side view illustrating the sunroof apparatus including the drive apparatus according to the embodiment of the present invention.
Figure 3:
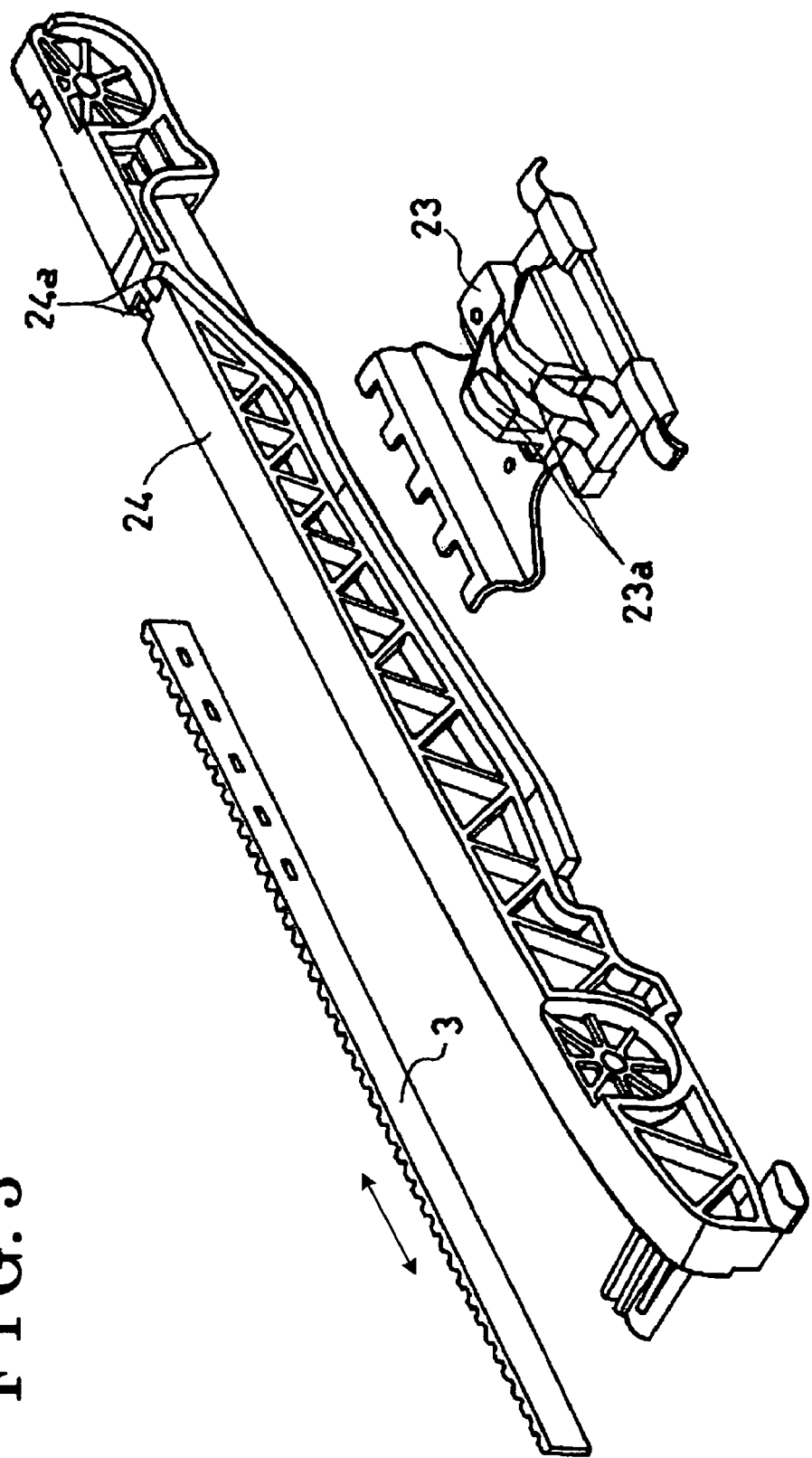
FIG. 3 represents a perspective view illustrating a lifting link of the sunroof apparatus including the drive apparatus according to the embodiment of the present invention.
Figure 6:
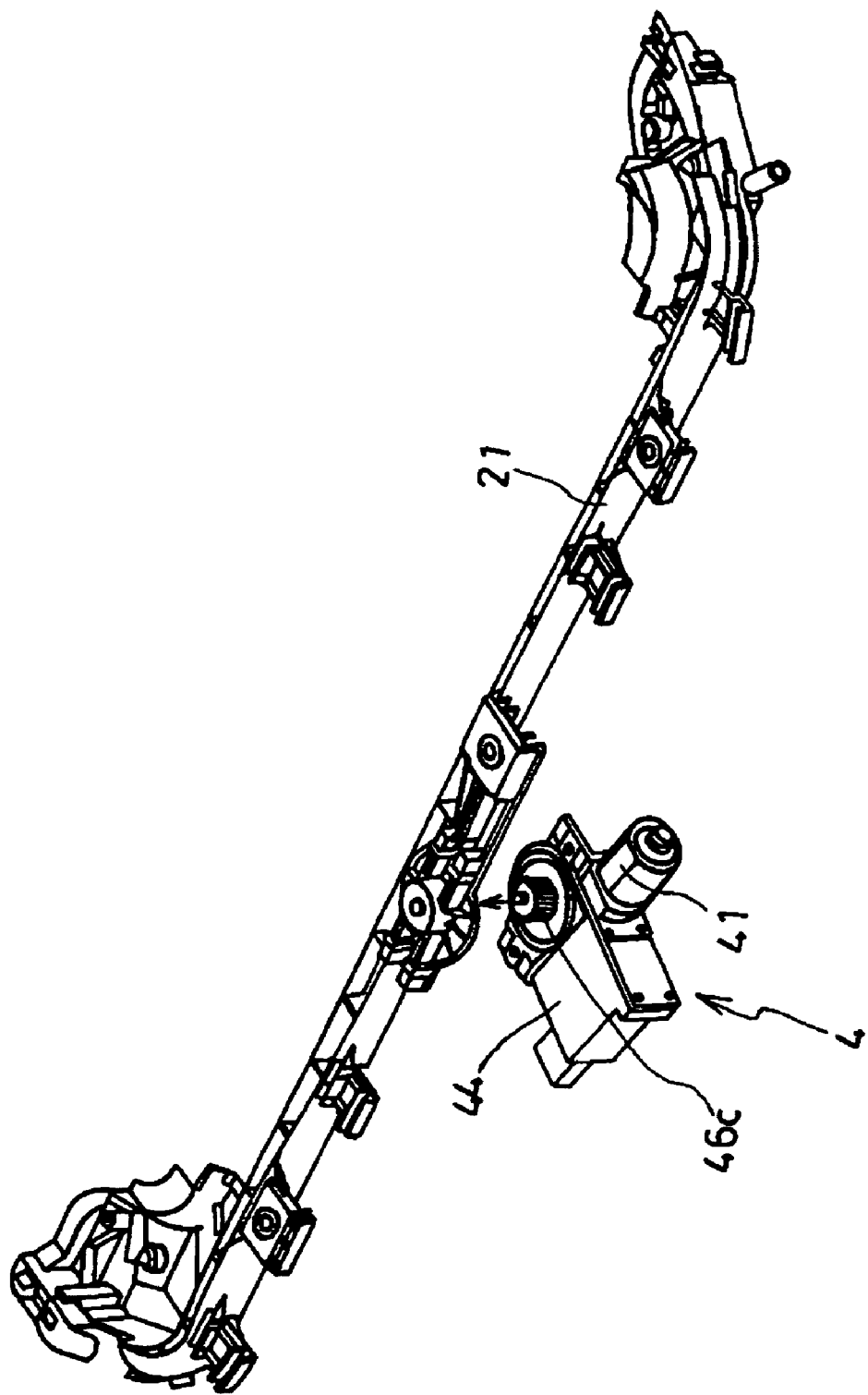
FIG. 6 represents a perspective view illustrating a mount condition of the drive apparatus according to the embodiment of the present invention to the sunroof apparatus.

As illustrated in FIG. 2 and FIG. 3, the sunroof apparatus includes guide rails 22 provided along side ends, in other words, right and left ends, of the opening portion 12 of the vehicle 1 and connected mutually at the front ends of the guide rails 22 by a housing 21 (illustrated in FIG. 6), a shoe 23 (connection member) slidably supported by each guide rail 22 so as to be slidable in a longitudinal direction of each guide rail 22 (fore-aft direction of the vehicle), a lifting link 24 supported by each guide rail 22 so as to be slidable in a longitudinal direction of each guide rail 22 and so as to swing about the front end of the lifting link 24 in a vertical direction (up and down direction of the vehicle) and fixed to the movable panel 13, and a drive mechanism 4 (drive unit) connected to the shoe 23 via a transmission belt 3 (connection member).

The lifting link 24 has a long shape so as to be provided along each guide rail 22. Side surface of each lifting link 24 includes a long groove 24a extending in a longitudinal direction and bending in upper and lower directions.

Each shoe 23 includes arm portions 23a facing mutually and sandwiching the lifting link 24. The arm portions 23a of the shoe 23 are fitted into the long groove 24a of the lifting link 24 so as to be movable relative to the long groove 24a of the lifting link 24.

Figure 4:
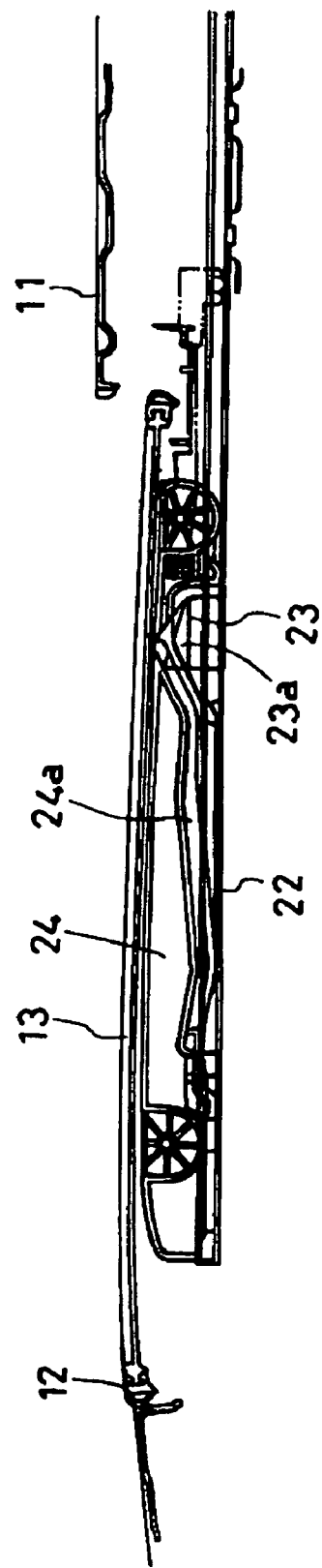
FIG. 4 represents a side view illustrating an action of the sunroof apparatus including the drive apparatus according to the embodiment of the present invention.

In a configuration described above, FIG. 2 represents an entirely closed condition in which the opening portion 12 is closed by the movable panel 13. In this condition, the arm portion 23a of the shoe 23 is located at a horizontal portion of the long groove 24a of the lifting link 24. In this entirely closed condition, when the shoe 23 is moved so as to slide relative to the guide rail 22 in backward direction of the vehicle (right direction in FIG. 2), the arm portion 23a relatively moves in the long groove 24a and the arm portion 23a is located at a portion bended in an upper direction of the long groove 24a. As a result, the lifting link 24 swings clockwise in FIG. 2 about the front end of the lifting link 24 so that a rear end of the lifting link 24 moves downward. As a result, as illustrated in FIG. 4, a rear end of the movable panel 13 moves downward, in other words, becomes a condition that the movable panel 13 is tilted downward so that the movable panel 13 becomes slidable in backward direction of the vehicle so as to slide the movable panel 13 for opening the opening portion 12. In this condition, when the shoe 23 is moved relative to the guide rail 22 in backward direction of the vehicle, the arm portion 23a becomes engaging with the rear end of the long groove 24a, and the lifting link 24 starts to slide with the shoe 23 in a backward direction of the vehicle. As a result, the movable panel 13 is slid so as to make an opened condition of the opening portion 12 opened by sliding the movable panel 13 (sliding action of the movable panel 13 for opening the opening portion 12). Further, in this opened condition of the opening portion 12 opened by sliding the movable panel 13, when the shoe 23 is moved in a forward direction of the vehicle, in other words, an inverse direction as in the action described above, the movable panel 13 makes the entirely closed condition of the opening portion 12 (sliding action of the movable panel 13 for closing the opening portion 12).

Figure 5:
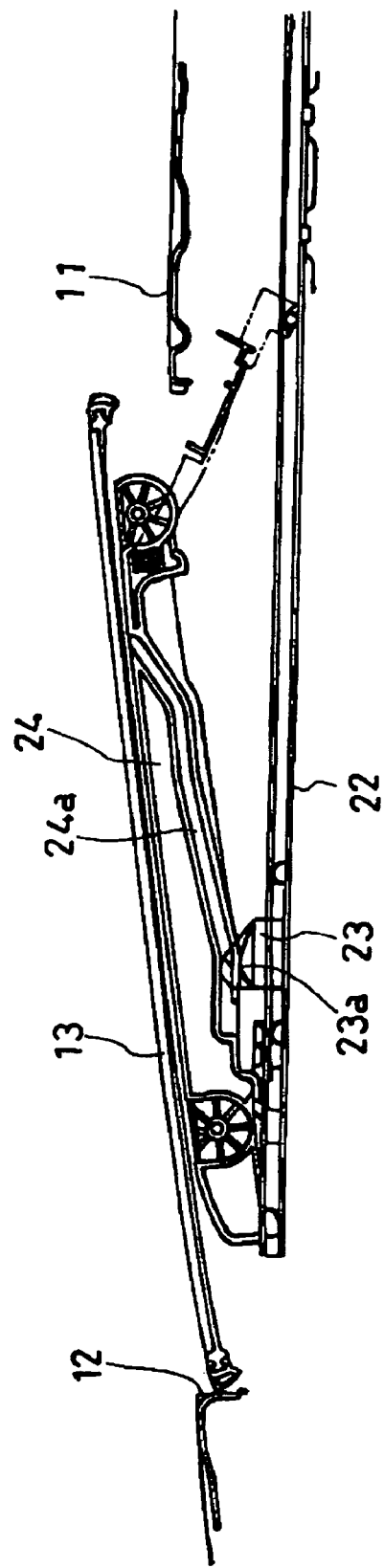
FIG. 5 represents a side view illustrating an action of the sunroof apparatus including the drive apparatus according to the embodiment of the present invention.

In the entirely closed condition illustrated in FIG. 2, when the shoe 23 is moved so as to slide relative to the guide rail 22 in a forward direction of the vehicle (left direction in FIG. 2), the arm portion 23a moves in and relative to the long groove 24a, and becomes to be located at a portion bended downward of the long groove 24a. Accordingly, the lifting link 24 swings about the front end of the lifting link 24 so that the rear end of the lifting link 24 is moved upward in a counterclockwise direction in FIG. 3. As a result, as illustrated in FIG. 5, the rear end of the movable panel 13 moves upward for making a condition of the movable panel 13 tilted up for opening the opening portion 12 opened by tilting the movable panel 13 upward (tilting-upward action of the movable panel 13 for opening the opening portion 12). Further, in the condition that the movable panel 13 is tilted up, when the shoe 23 is moved so as to slide in a backward direction of the vehicle, in other words, an inverse direction as in the action described above, the movable panel 13 makes the entirely closed condition of the opening portion 12 (tilting action of the movable panel 13 for closing the opening portion 12).

In addition, the sliding action of the shoe 23 is performed by driving force generated by action of the drive mechanism 4 transmitted to the shoe 23 through the transmission belt 3 connected to the shoe 23. In addition, configuration of connection between the drive mechanism 4 and the transmission belt 3 will be explained in detail in later part.

Next, the drive mechanism 4 will be explained.

As illustrated in FIG. 6 to FIG. 9, the drive mechanism 4 mainly includes an electrically driven motor 41 (rotational drive apparatus, drive motor), a reduction gear mechanism 42 and a circuit board 43 on which a controller 5 (control means, described later) and Hall elements 6, 7, and 8 are mounted.

The electrically driven motor 41 is attached to a case 44 fixed at the housing 21 of the sunroof apparatus 2. The electrically driven motor 41 includes a rotational shaft 41a extending in the case 44. The reduction gear mechanism 42 includes a worm gear 45 and a wheel gear 46. A tooth portion 46a provided along a periphery of the wheel gear 46 engages with the worm gear 45. The worm gear 45 is fixed at the rotational shaft 41a so as to rotate with the rotational shaft 41a of the electrically driven motor 41. The wheel gear 46 is rotatably supported by a support shaft 44a standing from the case 44. An output gear portion 46c (output member) is provided on an upper surface 46b (upper surface in FIG. 9) of the wheel gear 46. The transmission belt 3 connected to the shoe 23 is engaged with the output gear portion 46c.

In this configuration, when the electrically driven motor 41 is actuated, the rotational shaft 41a is rotated. The rotation of the rotational shaft 41a is reduced through an engagement between the worm gear 45 and the wheel gear 46. Thus, the output gear portion 46c is rotated. Because the transmission belt 3 connected to the shoe 23 engages with the output gear portion 46c, the rotation of the output gear portion 46c moves the transmission belt 3 in an arrow direction of FIG. 3. As a result, the shoe 23 moves so as to slide relative to the guide rail 22. In addition, when the electrically driven motor 41 is actuated in regular direction, the shoe 23 moves so as to slide in a backward direction of the vehicle for performing an action for opening the opening portion 12 by sliding the movable panel 13 or performing an action for closing the opening portion 12 by tilting the movable panel 13. When the electrically driven motor 41 is actuated in an inverse direction, the shoe 23 moves so as to slide in a forward direction of the vehicle for performing an action for closing the opening portion 12 by sliding the movable panel 13 or performing an action for opening the opening portion by tilting the movable panel 13.

The circuit board 43 is accommodated in the case 44, and covered by the cover 47. A Hall element 6 (first pulse signal generator) and a Hall element 7 are attached at parts of the circuit board 43 facing the rotational shaft 41a. A Hall element 8 (second pulse signal generator) is attached at a part of the circuit board 43 facing the wheel gear 46.

A magnet 41b is provided at a peripheral surface of the rotational shaft 41a facing the Hall elements 6 and 7. The Hall element 6 emits a pulse when the magnet 41b passes near the Hall element 6 while the rotational shaft 41a is rotated. The Hall element 7 emits a pulse when the magnet 41b passes near the Hall element 7 while the rotational shaft 41a is rotated. Thus, each of the Hall elements 6 and 7 emit a pulse every cycle of rotation of the rotational shaft 41a. As an alternative configuration, the rotational shaft 41a can be magnetized so that the rotational shaft 41a has a magnetized portion instead of using magnets.

Figure 7:
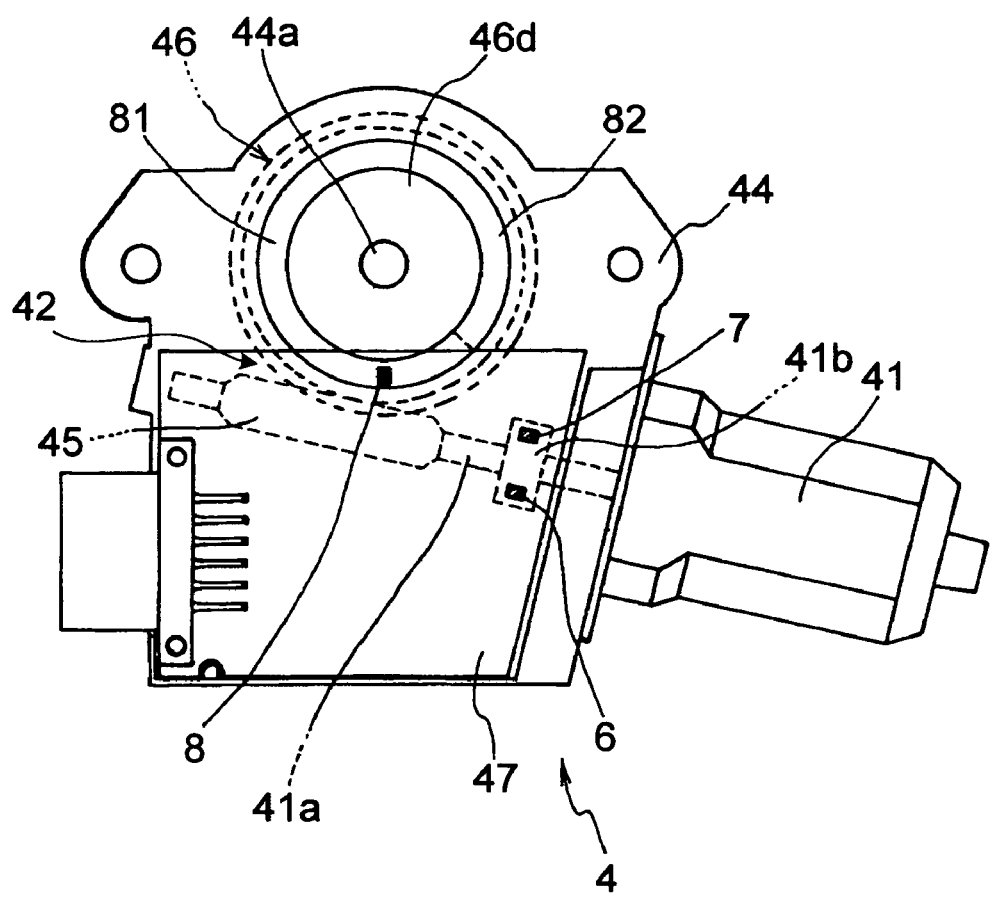
FIG. 7 represents a plane view illustrating the drive apparatus according to the embodiment of the present invention.
Figure 8:
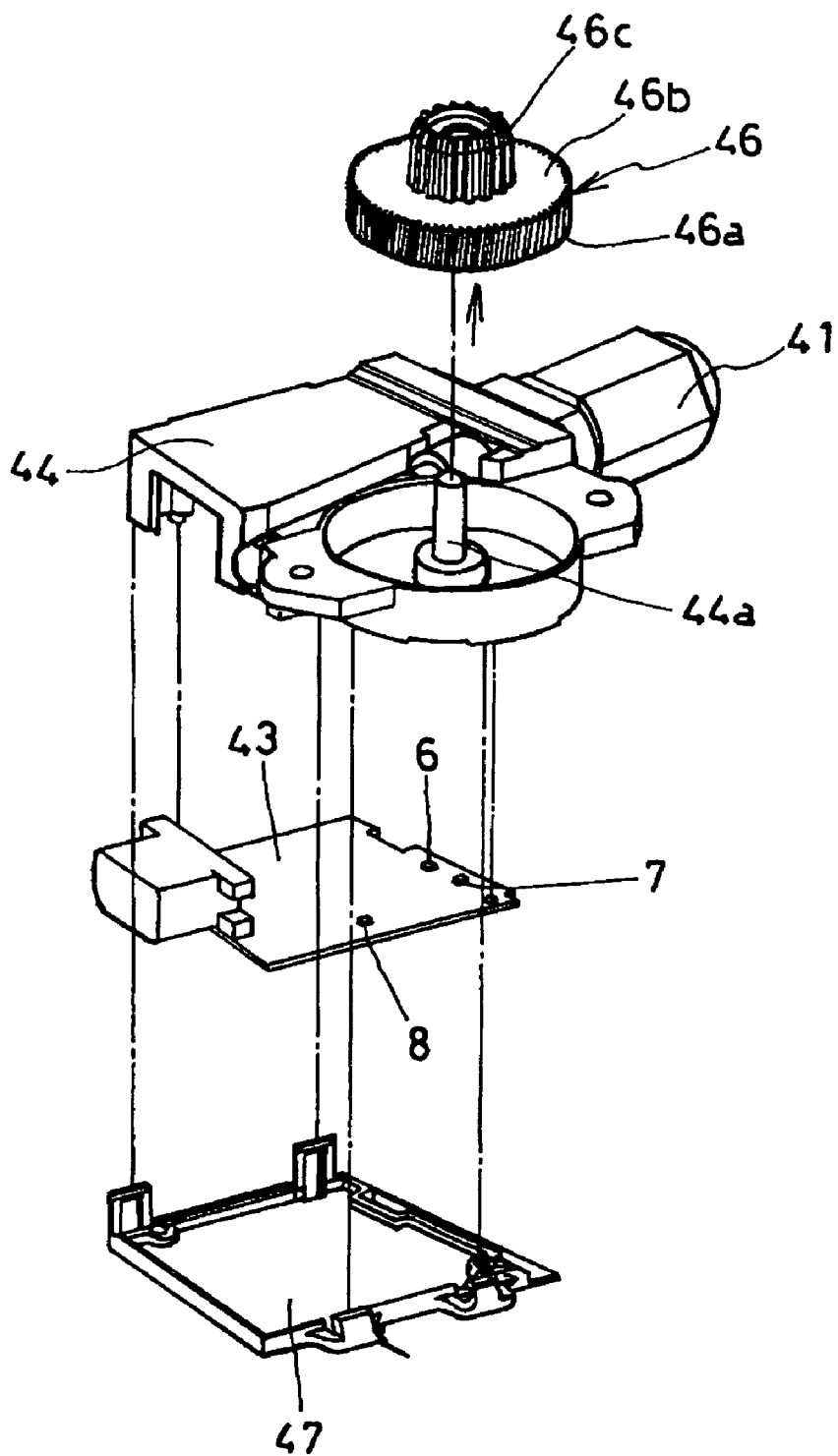
FIG. 8 represents an exploded perspective view illustrating the drive apparatus according to the embodiment of the present invention.
Figure 9:
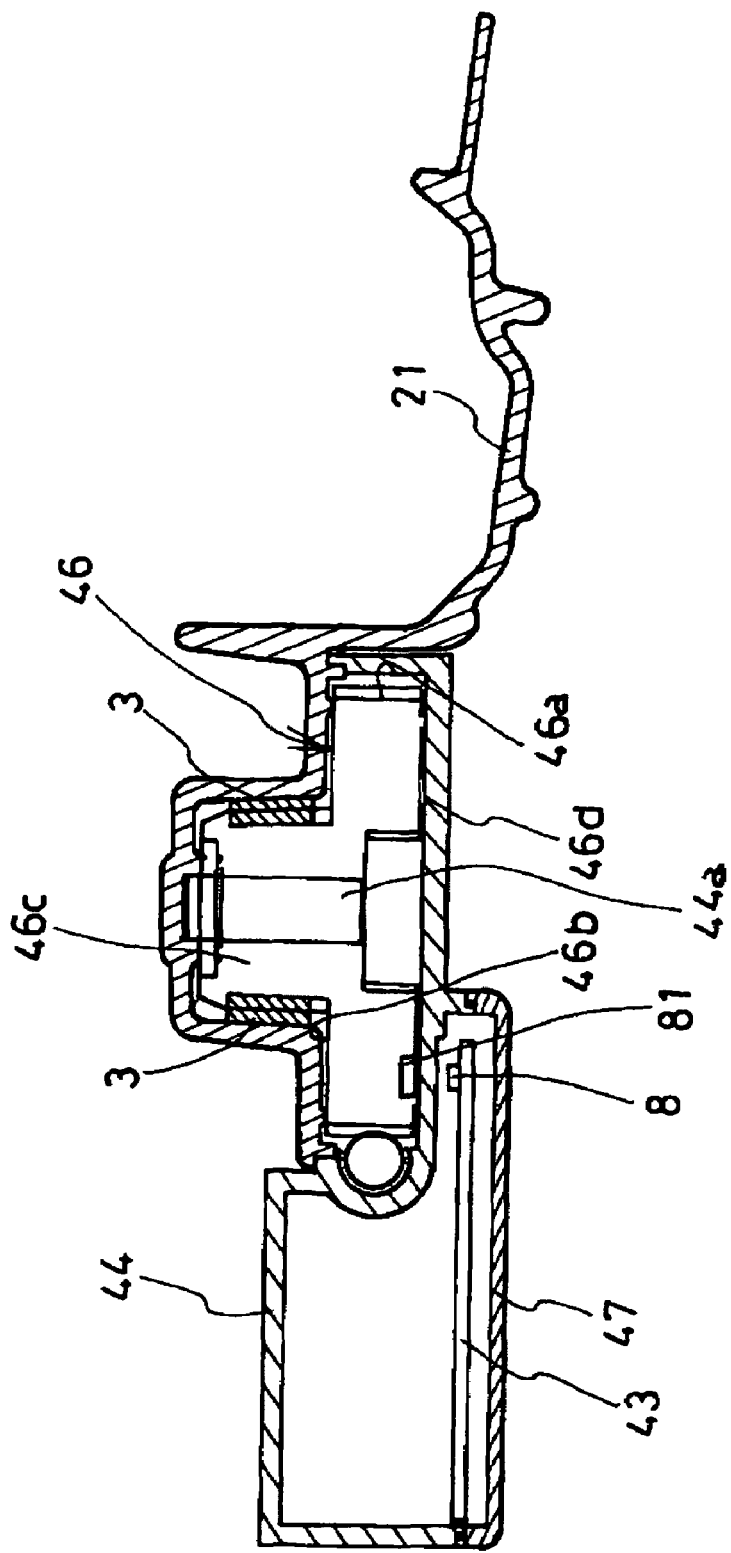
FIG. 9 represents a cross-sectional view illustrating the drive apparatus according to the embodiment of the present invention.

As illustrated in FIG. 7 and FIG. 9, an S pole magnet 81 and an N pole magnet 82 are fixed at a lower surface 46d (lower surface exhibited in FIG. 9) of the wheel gear 46, the surface facing the Hall element 8, so that the S pole magnet 81 and the N pole magnet 82 face the Hall element 8. The S pole magnet 81 has a thin arc shape. The N pole magnet 82 also has a thin arc shape. The S pole magnet 81 and the N pole magnet 82 are arranged on the lower surface 46d of the wheel gear 46 in series in the rotational direction of the wheel gear 46 so as to make a circular shape. Then, the Hall element 8 emits one cycle of pulse at every cycle of rotation of the wheel gear 46 as the S pole magnet 81 and the N pole magnet 82 pass near the Hall element 8 while the wheel gear 46 is rotated. Then, relation of the engagement between the output gear portion 46c of the wheel gear 46 and the transmission belt 3 connected to the shoe 23 is determined so that a pulse emitted by the Hall element 8 rises in front or at the back of the position of the movable panel 13 in which the movable panel 13 makes the entirely closed condition of the opening portion 12 (entirely closed position A of the movable panel 13), specifically, so that two edges of a pulse are generated so as to sandwich the entirely closed position A of the movable panel 13 while the shoe 23 is located at the horizontal part of the long groove 24a. In addition, by increasing the number of the S pole magnets 81 and the N pole magnets 82, for example, two cycles of pulses can be emitted at every one cycle of rotation of the wheel gear 46. As an alternative configuration, the wheel gear 46 can be magnetized so that the wheel gear 46 has a magnetized portion instead of using magnets.

Next, the controller 5 will be explained.

Figure 10:
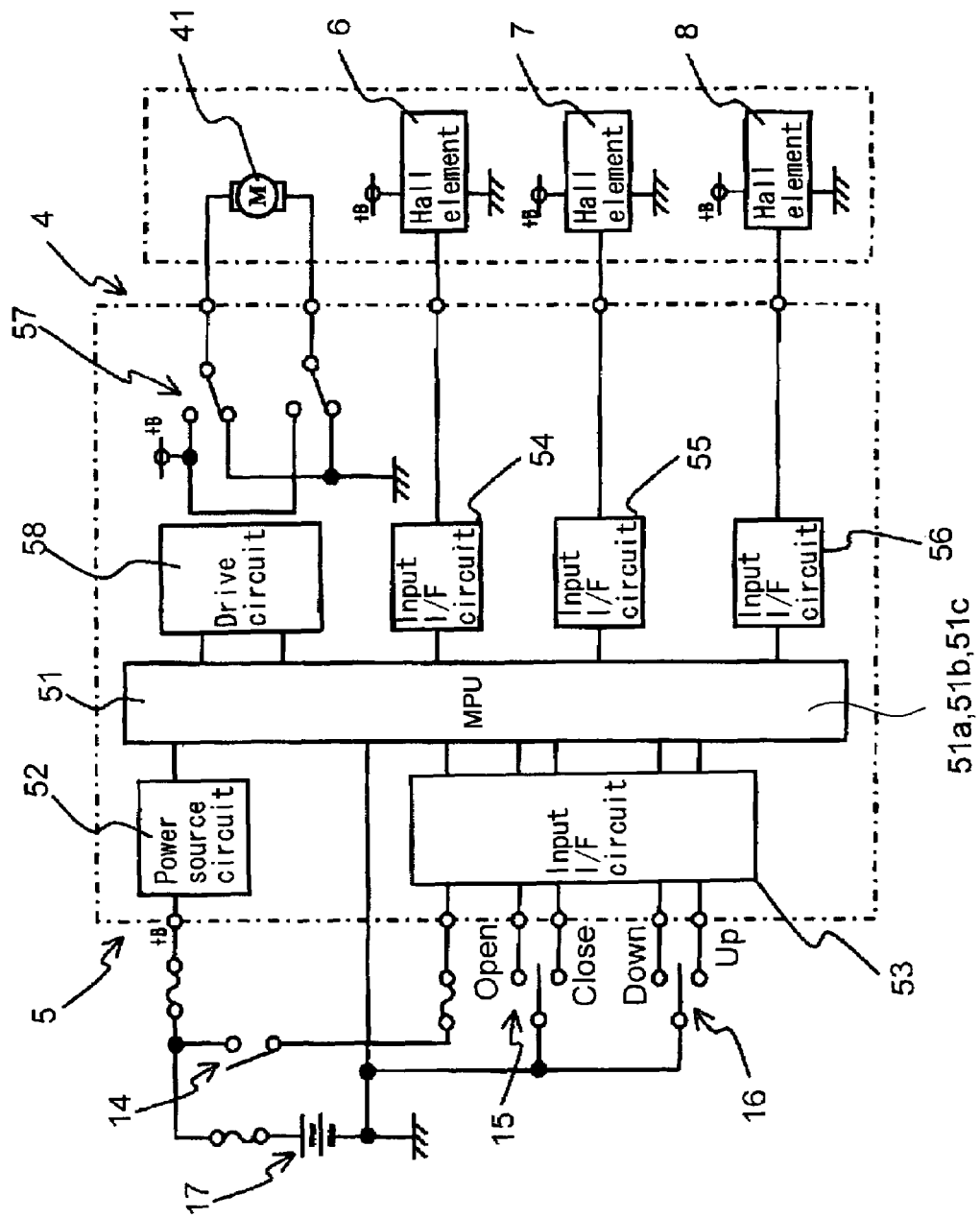
FIG. 10 represents a schematic view illustrating a circuit of a controller of the drive apparatus according to the embodiment of the present invention.

As illustrated in FIG. 10, the controller 5 controls actuations of the electrically driven motor 41 for moving the movable panel 13 in order to open and close the opening portion 12 corresponding to operations of a slide switch 15 for opening and closing operation by sliding the movable panel 13 and a tilt switch 16 for opening and closing operation by tilting the movable panel 13 operated by a user. The controller 5 includes a micro processor unit (MPU) 51. The MPU 51 is electrically connected to a battery 17 mounted on the vehicle 1 through a power source circuit 52. The MPU 51 is electrically connected to an ignition switch 14 of the vehicle 1 through an input interface circuit 53. A predetermined value of voltage is supplied to the MPU 51 from the power source circuit 52 corresponding to a signal from the ignition switch 14. Thus, the MPU 51 operable by programs becomes in operation. The slide switch 15 is electrically connected to the MPU 51 through the input interface circuit 53. Further, the tilt switch 16 is electrically connected to the MPU 51 through the input interface circuit 53. On and off signals of the slide switch 15 are transmitted to the MPU 51 corresponding to operations of the slide switch 15. On and off signals of the tilt switch 16 are also transmitted to the MPU 51 corresponding to operations of the tilt switch 16. In addition, the Hall elements 6, 7 and 8 are electrically connected to the MPU 51 through input interface circuits 54, 55 and 56 respectively. Thus, pulses emitted by the Hall elements 6, 7 and 8 are transmitted to the MPU 51 respectively. In addition, a drive circuit 58 for operating a relay utilized for supplying battery voltage to the electrically driven motor 41 for driving the electrically driven motor 41 is electrically connected to the MPU 51.

In the configuration described above, corresponding to operations of the slide switch 15 and the tilt switch 16 operated by a user, the MPU 51 emits drive signals and stop signals to the drive circuit 58. In addition, the MPU 51 drives the electrically driven motor 41 in a regular direction and in an inverse direction and stops the electrically driven motor 41. Furthermore, the MPU 51 performs an action for opening the opening portion 12 by tilting the movable panel 13, an action for closing the opening portion 12 by tilting the movable panel 13, an action for opening the opening portion 12 by sliding the movable panel 13, and an action for closing the opening portion 12 by sliding the movable panel 13.

The MPU 51 includes a counter 51a for counting pulses emitted by the Hall element 6. Further, the MPU 51 includes a counter 51b for counting pulses emitted by the Hall element 7. In addition, the MPU 51 includes another counter 51c for entirely closing the movable panel 13. Count values of the counter 51a and the counter 51b increment respectively when the Hall elements 6 and 7 emit pulses while the shoe 23 proceeds in backward direction of the vehicle (a direction of the movable panel 13 slid for opening the opening portion 12 and a direction of the movable panel 13 tilted for closing the opening portion 12) relative to the guide rail 22. The count values of the counter 51a and the counter 51b decrement respectively when the Hall elements 6 and 7 emit pulses while the shoe 23 proceeds in front direction of the vehicle (a direction of the movable panel 13 slid for closing the opening portion 12 and a direction of the movable panel 13 tilted for opening the opening portion 12) relative to the guide rail 22. Here, a direction in which the shoe 23 proceeds relative to the guide rail 22 can be known by relation between phases of the pulse emitted by the Hall element 6 and the pulse emitted by the Hall element 7. In addition, a count value of the counter 51c for entirely closing the movable panel 13 increments when the Hall element 6 emits a pulse. Then, on the basis of the count value of the counter 51a, the MPU 51 grasps a sliding position of the shoe 23 relative to the guide rail 22, in other words, recognizes a position of the movable panel 13 in relation to opening and closing. In addition, the MPU 51 grasps a sliding direction of the shoe 23 relative to the guide rail 22 as described above, in other words, recognizes a direction of the movable panel 13 in relation to opening and closing.

Next, an operation of the controller 5 will be explained with reference to FIG. 11.

In order that the movable panel 13 can surely makes the entirely closed condition of the opening portion 12, in other words, in order that the movable panel 13 is stopped surely at the entirely closed position A, the MPU 51 grasps a sliding position of the shoe 23 relative to the guide rail 22, in other words, recognizes a position of the movable panel 13 in relation to opening and closing, and controls the movable panel 13 so as to stop at the entirely closed position A of the opening portion 12. Specifically, the MPU 51 performs two routines: firstly, a control routine for stopping the movable panel 13 at the entirely closed position A, illustrated in FIGS. 17 and 18, performed in relation to an action for closing the opening portion 12 by sliding the movable panel 13 and an action for closing the opening portion 12 by tilting the movable panel 13, and; secondly, a learning routine of the entirely closed position, illustrated in FIGS. 12 to 16, performed before the control routine described above. In addition, the learning routine is performed on the process of assembling the sunroof apparatus 2 to the vehicle 1, or on the process of closing the opening portion 12 by tilting the movable panel 13 and on the process of closing the opening portion 12 by sliding the movable panel 13.

At first, the learning routine of the entirely closed position will be explained.

Figure 11:
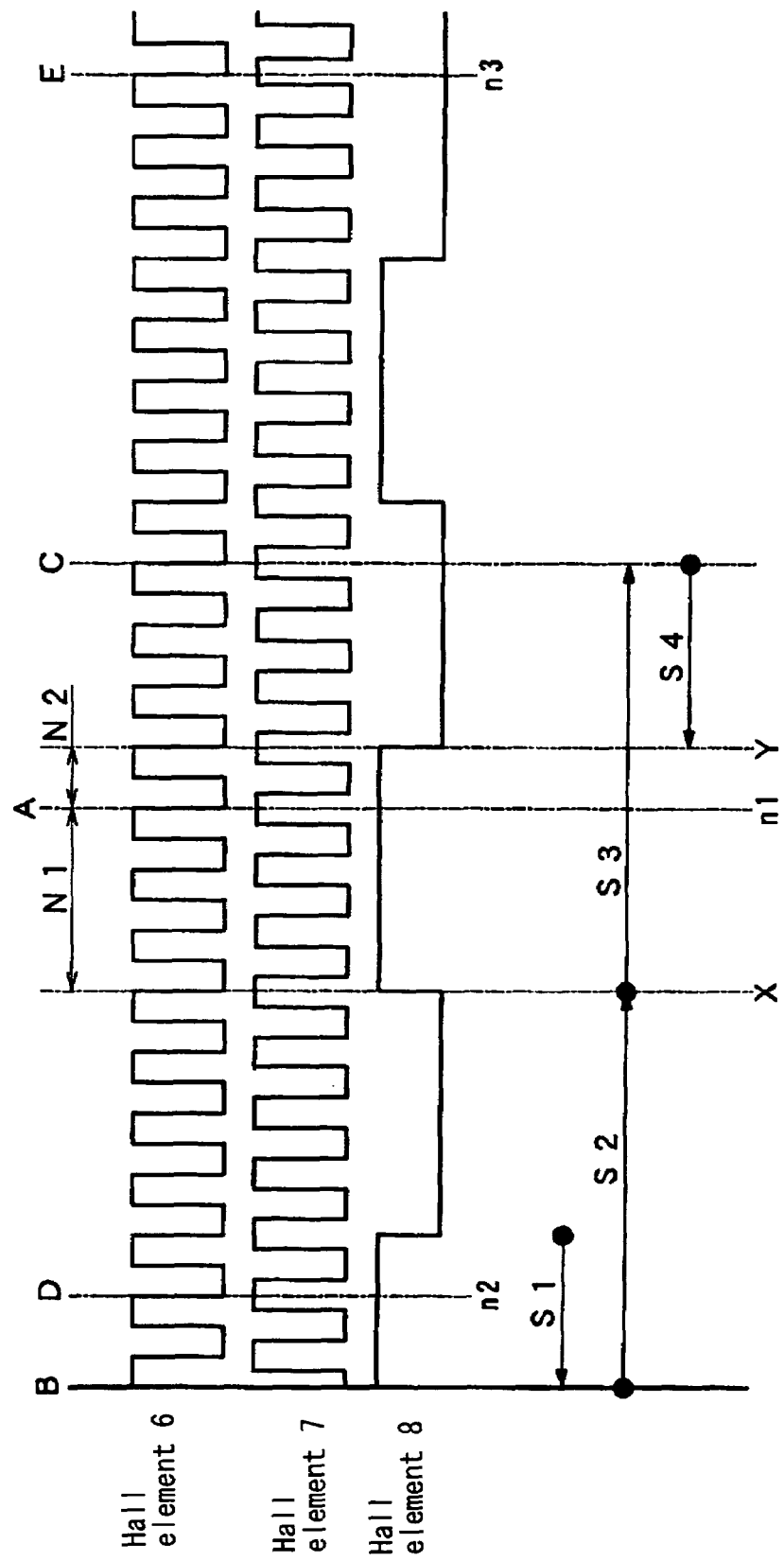
FIG. 11 represents a schematic view for explaining an overview of an action of the drive apparatus according to the embodiment of the present invention.
Figure 12:
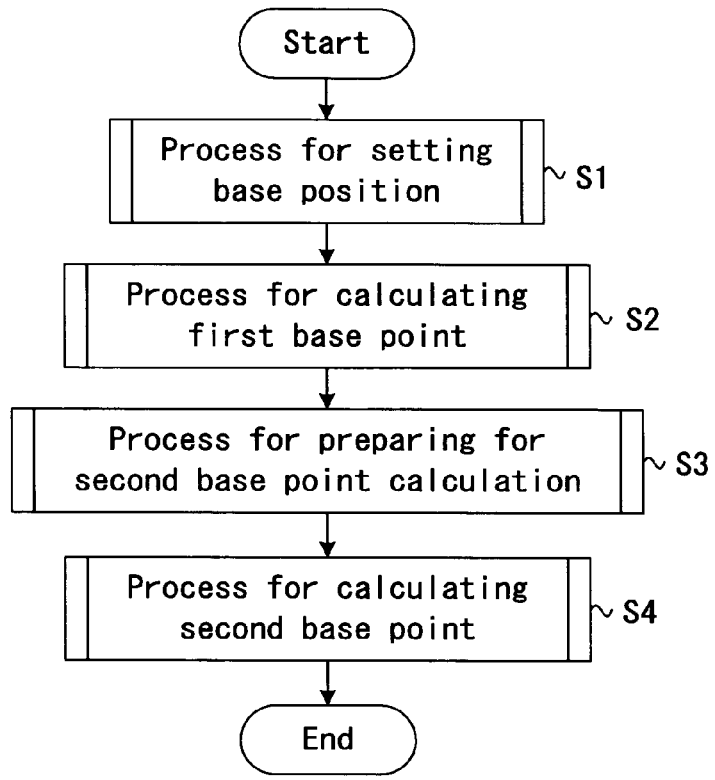
FIG. 12 represents a flow chart illustrating an action of the controller of the drive apparatus according to the embodiment of the present invention.

As illustrated in FIG. 11 and FIG. 12, the learning routine performs following processes in series: firstly, a base position-searching process S1 for setting a base position B (origin) of counting pulses emitted by the Hall elements 6 and 7 respectively by the counters 51a and 51b included in the MPU 51; secondly, a first base point calculation process S2 for calculating a first count value N1 during an action of the movable panel 13 tilted for closing the opening portion 12 from when the edge of the pulse is emitted by the Hall element 8 just before the movable panel 13 achieves the entirely closed position A to when the movable panel 13 achieves the entirely closed position A; thirdly, a preparation process S3 of a second base point calculation for calculating a second count value N2 during an action of the movable panel 13 slid for closing the opening portion 12 from when the edge of the pulse is emitted by the Hall element 8 just before the movable panel 13 achieves the entirely closed position A to when the movable panel 13 achieves the entirely closed position A, and; fourthly, a second base point calculation process S4 for calculating the second count value N2.

Figure 13:
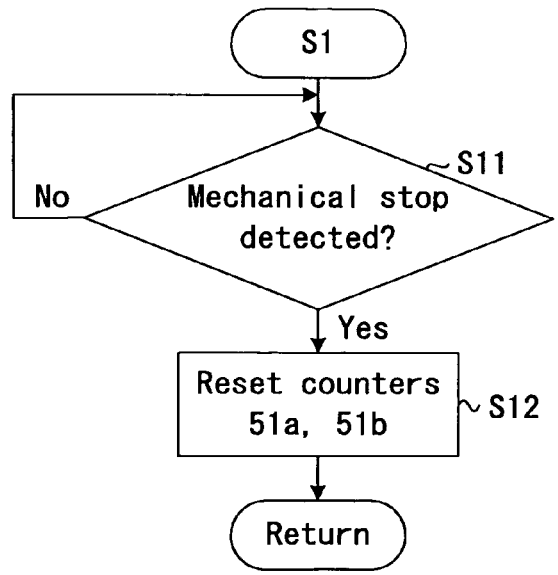
FIG. 13 represents a flow chart illustrating an action of the controller of the drive apparatus according to the embodiment of the present invention.

The base position-searching process S1 will be explained with reference to FIGS. 11 and 13.

Firstly, the MPU 51 actuates the electrically driven motor 41 for opening the opening portion 12 by tilting the movable panel 13 from the entirely closed position A. During this operation, when the movable panel 13 is mechanically stopped by a stopping member (not illustrated), the mechanically stopped condition is detected through excessive load applied to the electrically driven motor 41, or the like, in a step S11, and values of the counters 51a and 51b are reset in a step S12. Thus, a base position B is set.

Figure 14:
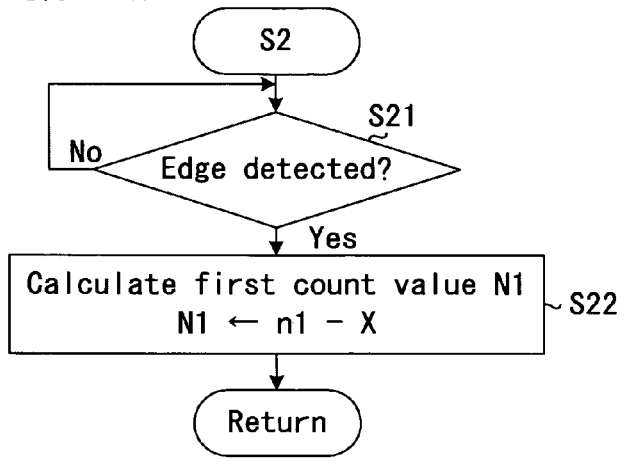
FIG. 14 represents a flow chart illustrating an action of the controller of the drive apparatus according to the embodiment of the present invention.

The first base point calculation process S2 will be explained with reference to FIGS. 11 and 14.

Firstly, the MPU 51 actuates the electrically driven motor 41 for closing the opening portion 12 by tilting the movable panel 13 from the base position B. During this operation, the counters 51a and 51b keep on counting the pulses respectively emitted by the Hall elements 6 and 7 from the base position B set in the step S1 described above. Then, when an edge of the pulse emitted by the Hall element 8 is detected in a step S21, a count value X of the counter 51a at this time and a predetermined count value n1 determined for a predetermined entirely closed position A are compared in a step S22. Thus, the first count value N1 from when the edge of the pulse emitted by the Hall element 8 is detected to when the movable panel 13 achieves the entirely closed position A is calculated and stored in a memory (random access memory; RAM) in the MPU 51. Thus, the first count value N1 is calculated.

Figure 15:
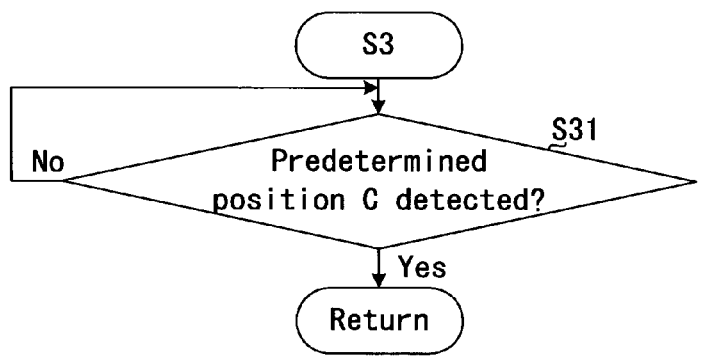
FIG. 15 represents a flow chart illustrating an action of the controller of the drive apparatus according to the embodiment of the present invention.

The preparation process S3 of a second base point-calculation will be explained with reference to FIGS. 11 and 15.

Firstly, the MPU 51 actuates the electrically driven motor 41 for continuing an action for closing the opening portion 12 by tilting the movable panel 13, and further, for continuing an action for opening the opening portion 12 by sliding the movable panel 13 over the entirely closed position A. During this operation, the counter 51a and 51b keep on counting the pulses emitted by the Hall elements 6 and 7 respectively from the base position B set in the process S1 described above. Then, in a step S31, the movable panel 13 is slid for opening the opening portion 12 until it is recognized, on the basis of the value of the counter 51a, that the shoe 23 is located at a predetermined position C. Thus, the movable panel 13 is located at the predetermined position C.

Figure 16:
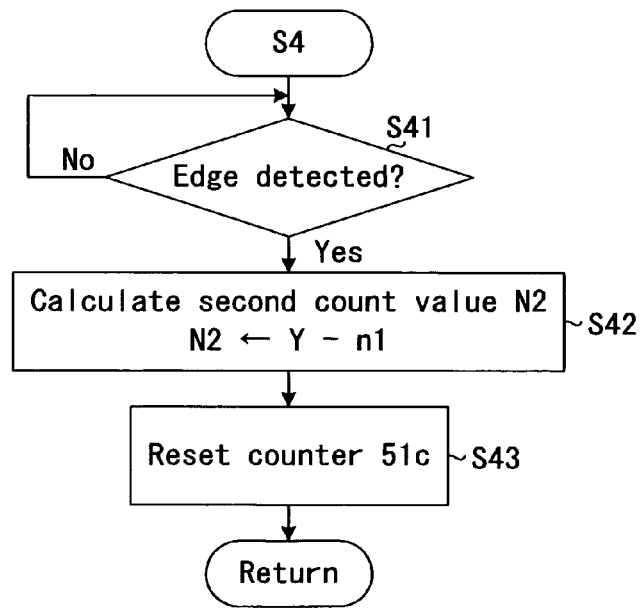
FIG. 16 represents a flow chart illustrating an action of the controller of the drive apparatus according to the embodiment of the present invention.

The second base point calculation process S4 will be explained with reference to FIG. 11 and FIG. 16.

Firstly, the MPU 51 actuates the electrically driven motor 41 for opening the opening portion 12 by sliding the movable panel 13 from the predetermined position C. During this operation, the counter 51a and 51b keep on counting the pulses emitted by the Hall element 6 and 7 respectively from the base position B set in the process S1 described above. Then, when an edge of a pulse emitted by the Hall element 8 is detected in a step S41, a count value Y of the counter 51a at this time and a predetermined count value n1 determined for the predetermined entirely closed position A are compared in a step S42. Thus, the second count value N2 from when the edge of the pulse emitted by the Hall element 8 is detected to when the movable panel 13 achieves the entirely closed position A is calculated and the second count value N2 is stored in a memory (RAM) in the MPU 51. Then, in a step S43, the counter 51c for stopping the movable panel 13 at the entirely closed position is reset. Thus, the second count value N2 is calculated.

As described above, the MPU 51 learns the first count value N1 and the second count value N2, which are base values for stopping the movable panel 13 at the entirely closed position A.

Next, the control routine for stopping the movable panel 13 at the entirely closed position will be explained.

Figure 17:
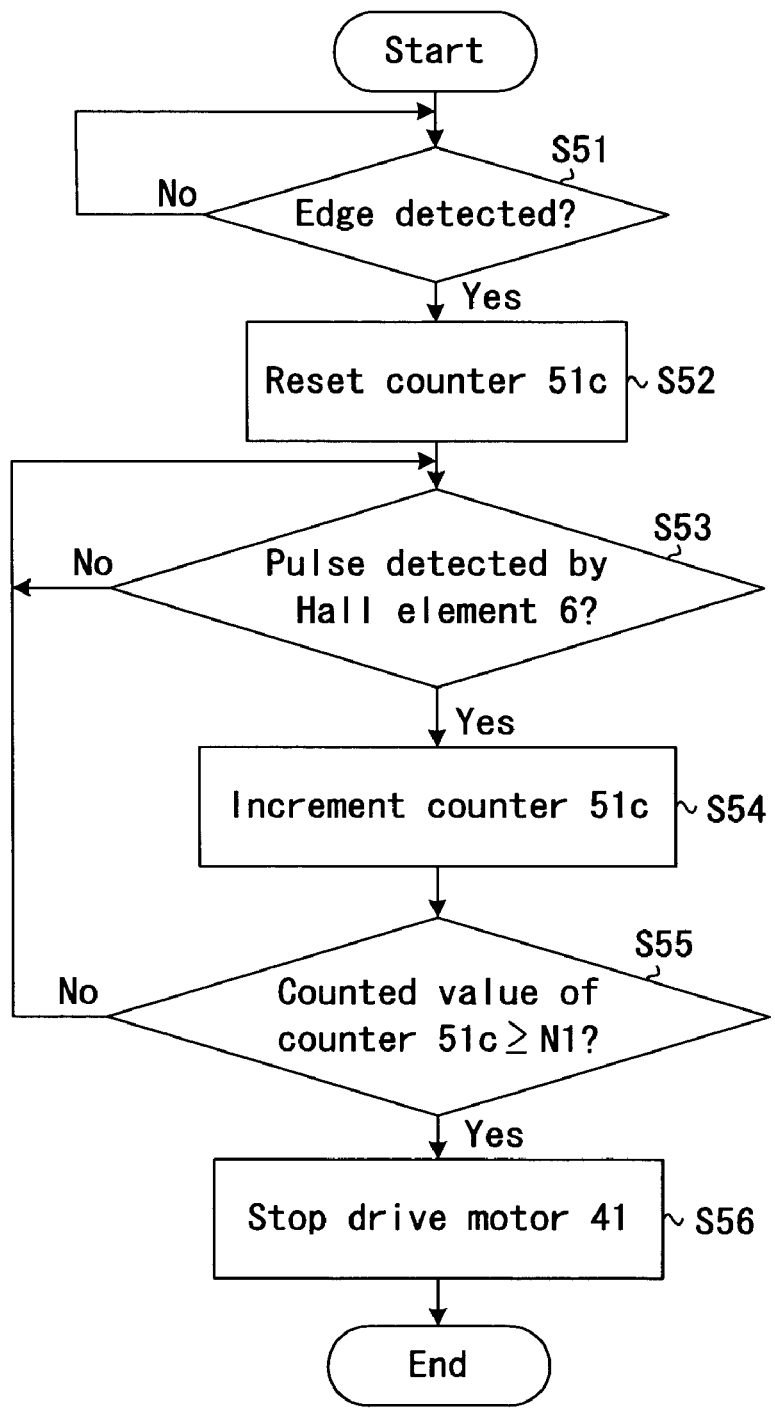
FIG. 17 represents a flow chart illustrating an action of the controller of the drive apparatus according to the embodiment of the present invention.

As illustrated in FIG. 11 and FIG. 17, when a user operates the tilt switch 16 for closing the opening portion 12 by tilting the movable panel 13 in order to make the entirely closed condition of the opening portion 12 from the condition where the opening portion 12 is opened by tilting the movable panel 13, the MPU 51 monitors pulses emitted by the Hall element 8 for judging whether an edge of the pulse is generated or not in a step S51. When an edge of the pulse emitted by the Hall element 8 is detected in the step S51, the value of the counter 51c for stopping the movable panel at the entirely closed position is reset in a step S52. Then, the count value of the counter 51c increments when the Hall element 6 emits a pulse in a step S53 and a step S54. After that, it is judged whether a count value of the counter 51c becomes equal to or more than the first counted value N1 or not in a step S55. When it is judged that the count value of the counter 51c becomes equal to or more than the first count value N1, it is recognized that the movable panel 13 is located at the entirely closed position A. Then, an action of the movable panel 13 tilted for closing the opening portion 12 is stopped in a step S56. Thus, the movable panel 13 is located surely at the entirely closed position A, and as a result, the opening portion 12 becomes the entirely closed condition.

Figure 18:
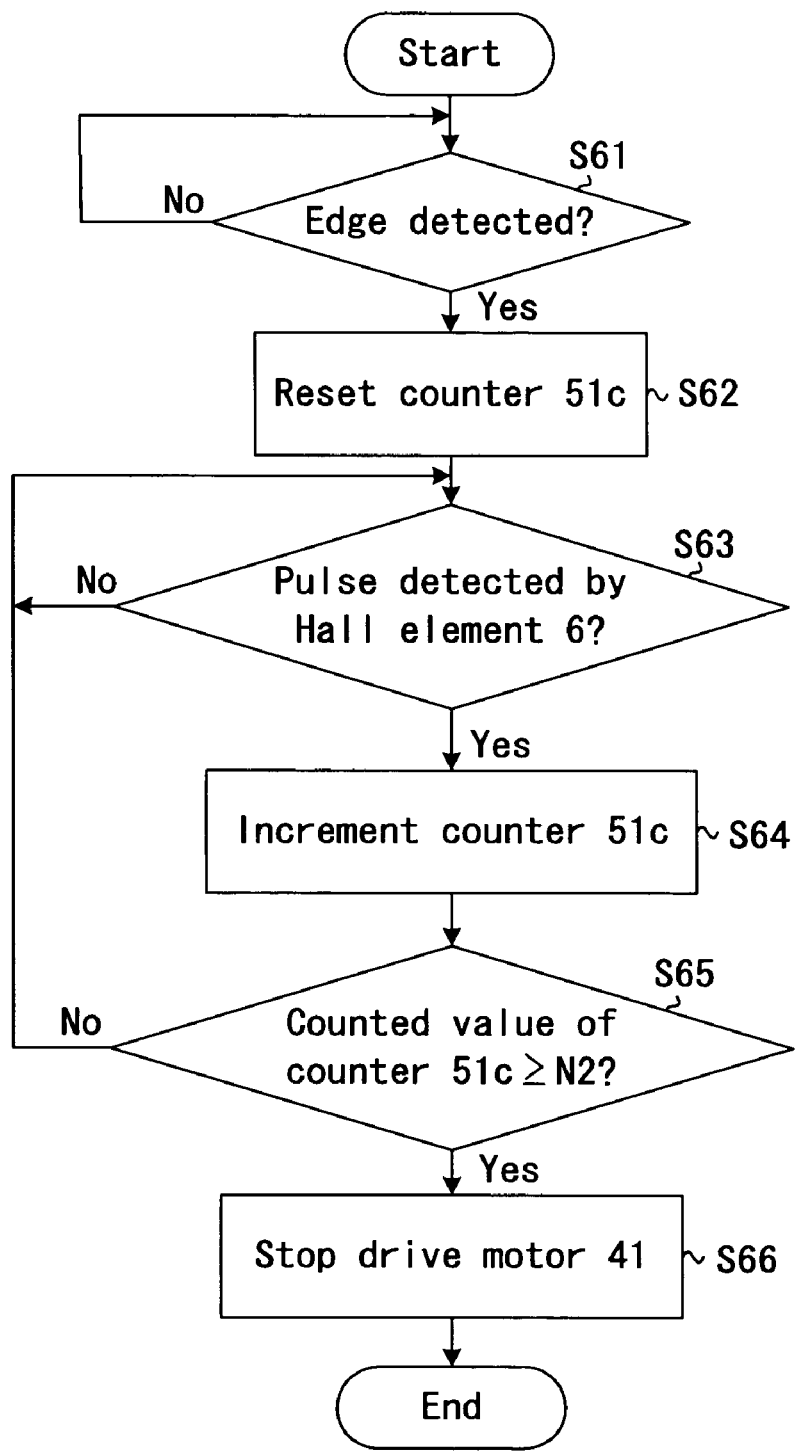
FIG. 18 represents a flow chart illustrating an action of the controller of the drive apparatus according to the embodiment of the present invention.

As illustrated in FIGS. 11 and 18, when a user operates the slide switch 16 for closing the opening portion 12 by sliding the movable panel 13 in order to make the entirely closed condition of the opening portion 12 from the condition where the opening portion 12 is opened by sliding the movable panel 13, the MPU 51 monitors pulses emitted by the Hall element 8 for judging whether an edge of the pulse is generated or not in a step S61. When an edge of the pulse emitted by the Hall element 8 is detected in the step S61, a value of the counter 51c for stopping the movable panel 13 at the entirely closed condition is reset in a step S62. Then, the count value of the counter 51c increments when the Hall element 6 emits a pulse in a step S63 and a step S64. After that, it is judged whether a count value of the counter 51c becomes equal to or more than the second count value N2 or not in a step S65. When it is judged that a count value of the counter 51c becomes equal to or more than the second count value N2, it is recognized that the movable panel 13 is located at the entirely closed position A. Then, in a step S66, an action of the movable panel slid for closing the opening portion 12 is stopped. Thus, the movable panel 13 is located surely at the entirely closed position A, and as a result, the opening portion 12 becomes the entirely closed condition.

As described above, when the movable panel 13 is stopped at the entirely closed position A, by recognizing the entirely closed position A of the movable panel 13 on the basis of the learned and stored first count value N1 and the second count value N2, the recognition of the entirely closed position A can be more accurate than that determined only on the basis of the value of the counter 51a counting the pulses emitted by the Hall element 6. Thus, even if the count value of the counter 51a is different from an actual number of pulses emitted by the Hall element 6, the MPU 51 can recognize the entirely closed position A surely and accurately. In addition, because the Hall element 8 emits a pulse corresponding to a rotation of the wheel gear 46 of the reduction gear mechanism 42, plurality of base points (according to the embodiment, the two values X and Y of the counter 51a when an edge of the pulse emitted by the Hall element 8 is detected) can be set. In this time, the MPU 51 can be configured so as to count an edge of the pulse emitted by the Hall element 8, and the count value can be related to the opening/closing position of the movable panel 13. In addition, in the embodiment, the MPU 51 recognizes values X and Y of the counter 51a when an edge of the pulse emitted by the Hall element 8 is detected, but not limited. The MPU 51 can recognizes these values as positions X, Y of the movable panel 13 in relation to opening and closing, and the values of the counter 51a can be recognized as information of positions.

In the embodiment, because the wheel gear 46 is formed as a unit with the output gear portion 46c, a pulse emitted by the Hall element 8 corresponds to a rotation of the output gear portion 46c. However, when the output gear portion 46c is formed separately from the wheel gear 46, the S pole magnet 81 and the N pole magnet 82 can be provided at the output gear portion 46c, and the Hall element 8 can be provided so as to emit a pulse corresponding to a rotation of the output gear portion 46c.

According to the embodiment of the present invention, the drive apparatus for an opening/closing body for a vehicle is applied to control of stopping the movable panel 13 at the entirely closed position A, but it is not limited to the entirely closed position A. For example, the drive apparatus for an opening/closing body for a vehicle can be applied to a control of stopping the movable panel 13 at a position D in which the opening portion 12 is opened by tilting the movable panel 13 or a control of stopping the movable panel 13 at a position E for opening the opening portion 12 by sliding the movable panel 13. Here, according to this additional embodiment, the recognition of the position D of the movable panel 13 for opening the opening portion 12 by tilting the movable panel 13 is performed by judging whether a count value of the counter 51a is equal to a predetermined value n2 or not. Similarly, the recognition of the position E for opening the opening portion 12 by sliding the movable panel 13 is performed by judging whether a count value of the counter 51a is equal to a predetermined value n3 or not.

According to an aspect of the present invention, because a pulse signal emitted by a second pulse signal generator corresponds to a rotation of a reduction gear mechanism or an output member for moving a connection member, a plurality of timings when the pulse signal emitted by the second pulse signal generator can be set in a whole stroke of opening/closing an opening/closing body. Accordingly, a control means can accurately recognize an opening/closing position of the opening/closing body without depending on a way of opening/closing. In addition, there is no need of providing a plurality of second pulse signal generator. As a result, the number of parts and cost are not increased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A drive apparatus for an opening/closing body for a vehicle, comprising:
    a drive unit including a rotational drive apparatus, a reduction gear mechanism linked with a rotational shaft of the rotational drive apparatus, and an output member linked with the rotational shaft through the reduction gear mechanism and linked with the opening/closing body through a connection member;

a first pulse signal generator provided at the drive unit and generating a first pulse signal on the basis of a rotation of the rotational shaft;

a second pulse signal generator provided at the drive unit and generating a second pulse signal on the basis of a rotation of either one of the reduction gear mechanism and the output member; and a control means for calculating an opening/closing position of the opening/closing body on the basis of the first pulse signal emitted by the first pulse signal generator utilizing the second pulse signal emitted by the second pulse signal generator as a base point and controlling the rotational drive apparatus corresponding to the opening/closing position of the opening/closing body.

2. The drive apparatus for an opening/closing body for a vehicle according to claim 1, wherein the control means includes a step of counting the first pulse signal emitted by the first pulse signal generator, a step of comparing a count value of the first pulse signal when the second pulse signal is input from the second pulse signal generator and a predetermined count value at a predetermined opening/closing position of the opening/closing body, and a step of calculating the predetermined opening/closing position on a result of the step of comparing.

3. The drive apparatus for an opening/closing body for a vehicle according to claim 2, wherein the predetermined opening/closing position is determined at an entirely closed position of the opening/closing body located in the middle of a whole stroke of opening/closing the opening/closing body.

4. The drive apparatus for an opening/closing body for a vehicle according to claim 1, wherein the rotational shaft includes a magnet.

5. The drive apparatus for an opening/closing body for a vehicle according to claim 1, wherein the rotational shaft is magnetized.

6. The drive apparatus for an opening/closing body for a vehicle according to claim 1, wherein the drive unit further includes a circuit board on which the first pulse signal generator and the second pulse signal generator are provided.

7. The drive apparatus for an opening/closing body for a vehicle according to claim 1, wherein the rotational shaft is provided so as to face the first pulse signal generator.

8. The drive apparatus for an opening/closing body for a vehicle according to claim 1, wherein the reduction gear mechanism includes a wheel gear provided so as to face the second pulse signal generator keeping a predetermined distance from the second pulse signal generator.

9. The drive apparatus for an opening/closing body for a vehicle according to claim 8, wherein the wheel gear includes an S pole magnet and an N pole magnet.

10. The drive apparatus for an opening/closing body for a vehicle according to claim 8, wherein the wheel gear is magnetized.

11. The drive apparatus for an opening/closing body for a vehicle according to claim 8, wherein the wheel gear is formed as a unit with the output member, and the connection member is connected to the output member.

12. The drive apparatus for an opening/closing body for a vehicle according to claim 11, wherein the connection member is engaged with the output member so as to be connected with the output member.

13. The drive apparatus for an opening/closing body for a vehicle according to claim 12, wherein the connection member includes a shoe linked with the opening/closing body and a transmission belt connected with the shoe and linked with the output member.

14. The drive apparatus for an opening/closing body for a vehicle according to claim 13, wherein the shoe is slidably provided along the opening/closing body.

15. The drive apparatus for an opening/closing body for a vehicle according to claim 2, wherein the control means includes a function of counting a pulse emitted by the first pulse signal generator and a pulse emitted by the second pulse signal generator.

* * * * *